(No Model.)

L. H. BLANKE.
METAL PACKING CASE FOR FOOD PRODUCTS.

No. 567,938. Patented Sept. 15, 1896.

Witnesses
W. G. Alexander.
E. E. Vennell.

Inventor
Louis H. Blanke,
By Attorneys

UNITED STATES PATENT OFFICE.

LOUIS H. BLANKE, OF FORT WORTH, TEXAS, ASSIGNOR OF ONE-HALF TO H. F. REITENBACH, OF SAME PLACE.

METAL PACKING-CASE FOR FOOD PRODUCTS.

SPECIFICATION forming part of Letters Patent No. 567,938, dated September 15, 1896.

Application filed September 19, 1895. Serial No. 562,966. (No model.)

*To all whom it may concern:*

Be it known that I, LOUIS H. BLANKE, a citizen of the United States, residing at the city of Fort Worth, in the State of Texas, have invented a certain new and useful Metal Packing-Case for Food Products, of which the following is such a full, clear, and exact description as will enable any one skilled in the art to which it appertains to make and use the same, reference being had to the accompanying drawings, forming part of this specification.

My invention relates to a new and useful packing-case for food products, and more especially for cured meats, such as ham, breakfast-bacon, dried beef, &c.

The object of my invention is to provide a packing-case for meats and other food products, which case will be a more perfect protection against flies, souring, shrinking, &c., than the ordinary forms of packing.

My invention consists in a stamped packing-case of tin, black iron, or other suitable metal, having novel features of construction, as hereinafter described and claimed.

Figure 1:
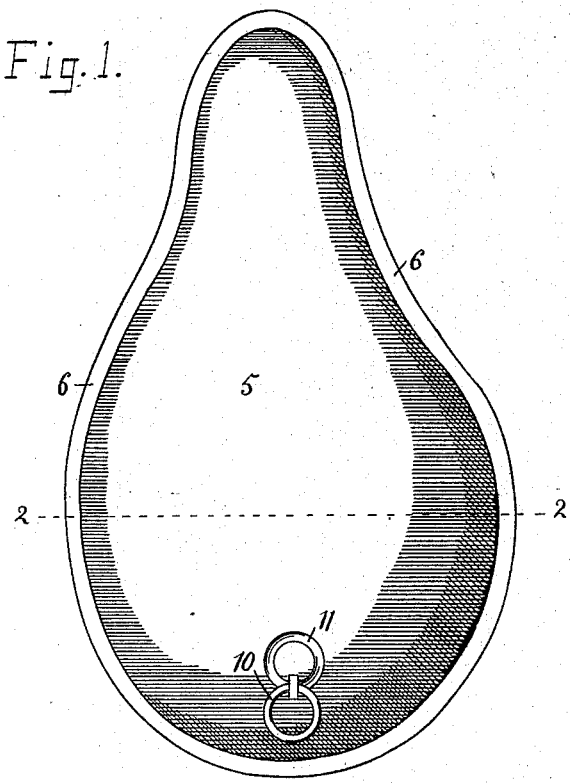
Figure 2:
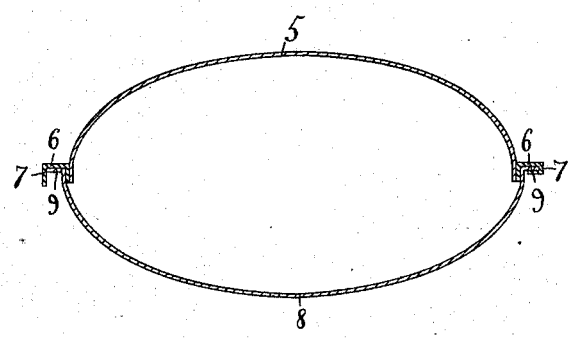

In the accompanying drawings, which illustrate a packing-case for a ham made in accordance with my invention, Figure 1 is a top view, and Fig. 2 is a section on the line 2 2 of Fig. 1.

Like marks of reference refer to similar parts in both views of the drawings.

5 is a top or cover stamped out of tin or other suitable metal to conform to the shape of the object to be incased.

6 is a rim also stamped out of suitable sheet metal and soldered or otherwise suitably secured to the edge of the cover 5. The rim 6 is provided with an inner flange forming, in connection with the edge of the cover, a double wall or thickness at the rim portion. The rim is also provided with an outer flange 7, thus forming a substantially U-shaped channel or groove around the cover 5.

8 is the lower part of the case, and is stamped out of suitable sheet metal to correspond in shape to the cover 5. The edge of the lower part 8 of the case is provided with a flange 9, of a proper width to fit in the U-shaped groove or channel around the edge of the cover 5. The flange 9 is preferably formed integral with the lower part 8 of the case. Hinged to the cover 5 is a ring 10 to serve as a means of suspending the case from any suitable support. In the cover 5 is stamped a concave circular groove 11, into which the ring 10 fits when not in use, so as to present a smooth surface. I have shown the ring 10 attached to the cover 5 and near the large end of the case, but it is obvious that it can be attached to either side and at any convenient point on the case.

To apply my improved packing-case, the article to be incased is placed in the lower part 8 of the case and the cover 5 pressed down upon it until the flange of the part 8 fits snugly in the U-shaped channel in the cover 5. The outer flange 7 is then folded around the flange 9, as shown at the right side of Fig. 2, by a hand-seamer or other suitable means, thus forming a close and secure joint between the parts of the case. The case being formed entirely of metal is impervious to moisture, flies, or other insects, and is thus superior to the covers made of burlap, yellow-washed canvas, paper, &c., such as are commonly used for cured meats, &c. The flange part of the case, it will be seen, is strengthened by the double wall on the rim part of the case, thus providing a reinforce of three thicknesses located at the inner side of the sealing-rim, which has the advantage of providing great stability to the case.

Having fully set forth my invention what I claim as new, and desire to secure by Letters Patent of the United States, is—

A stamped metal packing-case comprising a rim part and a flange part; the rim part having a peripheral U-shaped rim located entirely on the outer side of the rim part and providing a channel, and the flange part having an outturned flange fitting in the channel of the rim, the rim part and the inner side of the rim providing a double wall within the flange part; substantially as described.

In testimony whereof I have hereunto set my hand and affixed my seal in the presence of the two subscribing witnesses.

LOUIS H. BLANKE. [L. S.]

Witnesses:
H. F. REITENBACH,
CHAS. E. JONES.